United States Patent [19]

Rhode

[11] Patent Number: 5,244,216
[45] Date of Patent: Sep. 14, 1993

[54] LABYRINTH SEAL

[75] Inventor: David L. Rhode, Bryan, Tex.

[73] Assignee: The Texas A & M University System, College Station, Tex.

[21] Appl. No.: 799,903

[22] Filed: Nov. 26, 1991

Related U.S. Application Data

[63] Continuation of Ser. No. 379,328, Jul. 12, 1989, abandoned, which is a continuation-in-part of Ser. No. 140,634, Jan. 4, 1988, abandoned.

[51] Int. Cl.$^5$ ............................................. F16J 15/32
[52] U.S. Cl. ........................................ 277/53; 277/55; 415/174.5
[58] Field of Search .................... 277/25, 53–57; 415/173.5, 174.5

[56] References Cited

U.S. PATENT DOCUMENTS

| | | | |
|---|---|---|---|
| 835,836 | 11/1906 | Schulz | 415/174.5 |
| 1,020,699 | 3/1912 | Kieser | 277/53 |
| 1,482,031 | 1/1924 | Parsons et al. | 277/57 |
| 1,831,242 | 11/1931 | Hanzlik . | |
| 3,231,285 | 1/1966 | Weltmer et al. | 277/53 |
| 3,262,635 | 7/1966 | Smuland | 277/57 |
| 3,630,529 | 12/1971 | Ball | 277/56 |
| 3,701,536 | 10/1972 | Matthews et al. | 415/174.5 |
| 3,865,504 | 2/1975 | Benz | 277/53 |
| 3,897,169 | 7/1975 | Fowler | 415/172 |
| 3,940,153 | 2/1976 | Stocker | 277/57 |
| 4,335,886 | 6/1982 | Frey et al. | 277/25 |
| 4,500,098 | 2/1985 | Wilcox et al. | 277/25 |

FOREIGN PATENT DOCUMENTS

| | | | |
|---|---|---|---|
| 0433898 | 9/1926 | Fed. Rep. of Germany | 277/56 |
| 0013004 | of 1907 | United Kingdom | 277/56 |
| 28141 | of 1909 | United Kingdom . | |

OTHER PUBLICATIONS

Stocker, H. L., "Advanced Labyrinth Seal Design Performance for High Pressure Ratio Gas Turbines," ASME Publication, Aug. 4, 1975.

Tipton, D. L., Scott, T. E., and Vogel, R. E., Labyrinth Seal Analysis, "Analytical and Experimental Development of a Design Model for Labyrinth Seals," AFWAL, Tr. 85-2103, vol. III, pp. 14–20, Jan. 1986.

*Primary Examiner*—William A. Cuchlinski, Jr.
*Assistant Examiner*—Daniel G. DePumpo
*Attorney, Agent, or Firm*—Baker & Botts

[57] ABSTRACT

An improved design for a labyrinth seal is disclosed. The present invention relates to a radially stepped labyrinth seal whereby the geometry of the sealing surfaces is to optimize flow deflection, thereby producing maximum turbulent shearing action. This is generally accomplished by the formation of sealing surfaces where the shape of the seal components is established as a function of the minimum clearance between the relatively movable members.

20 Claims, 4 Drawing Sheets

LABYRINTH SEAL

CROSS REFERENCES TO RELATED APPLICATIONS

This application is a continuation of Applicant's co-pending application Ser. No. 07/379,328 filed Jul 12, 1989 (now abandoned), which was a continuation-in-part of Applicant's co-pending application Ser. No. 07/140,634 filed Jan. 4, 1988 (now abandoned). The disclosure of both applications is hereby incorporated by reference.

TECHNICAL FIELD OF THE INVENTION

The present invention relates to an improved design for a high performance labyrinth seal. More specifically, the present invention relates to a radially stepped labyrinth seal wherein the geometry of the sealing surfaces is established to optimize flow deflection, thereby producing maximum turbulent shearing action. This is generally accomplished by the formation of a sealing surface where the geometry of the seal components is established as a function of the minimum clearance between the relatively rotatable members.

BACKGROUND OF THE INVENTION

Labyrinth seals are primarily used to reduce or control the internal leakage of fluid within such systems as gas and steam turbines, compressors, and pumps, where fluid flow between two relatively moving members generally occurs. More particularly, labyrinth seals are often used in sealing an element such as a rotary shaft to inhibit undesirable fluid flow past the shaft. When incorporated in a pump, the labyrinth seal is relied upon to inhibit leakage along the shaft of the fluid being pumped by the pump.

A labyrinth seal is generally characterized by a series of cavities or grooves formed along the adjacent surfaces of two relatively movable members, where these members defined a partial barrier between areas of high and low pressure. At successive stations or steps along the seal, the adjacent surfaces of these rotatable members are situated in close juxtaposition to each other such as to define annular slit-like orifices. Further in this type of seal design, a series of cavities or chambers are formed between these stations in order to retard fluid flow through the seal.

In operation, the previously described labyrinth design forms a seal between the rotatable members by forcing high velocity fluid to navigate the irregularly spaced adjacent surfaces formed between these relatively movable members, said fluid sequentially passing through the slit-like orifices to enter the enlarged cavities where the velocity of the fluid is largely dissipated in turbulence. In this, the basic concept of any labyrinth seal design is to create a highly frictional flow passage. Such a flow path will convert pressure energy into velocity energy, a large portion of which will be dissipated into heat via turbulent action.

One source of turbulence is created as a result of the wall shear friction between the high velocity fluid and the irregularly spaced adjacent surfaces of the seal. A second and more important source of turbulence results from the intense free shear layer friction between the high velocity leakage jet discharging from an orifice and the relatively slow moving fluid in the large cavity immediately downstream. As a result of the combination of these and other friction components, pressure energy is substantially reduce downstream of each orifice of a multi-cavity seal. The substantially reduced pressure in a given cavity formed downstream of a particular orifice results in smaller pressure changes occurring across the orifices further downstream, the ultimate effect resulting in reduced leakage across the seal as a whole.

A variety of labyrinth seal designs have evolved in the art to take advantage of the principles of dissipative fluid flow. One early design is seen in U.S. Pat. No. 1,020,699—Kieser. In this design, a centrifugal pump is provided with a stepped and grooved sealing surface such that the kinetic energy of the fluid flow across the sealing surface is somewhat dissipated through designed turbulence.

In another such design, U.S. Pat. No. 1,482,031—Parsons, a labyrinth seal is characterized by a radially stepped surface provided along the rotor, the stator being provided with a corresponding set of barrier members or collars disposed in close relationship thereto. In this fashion, high pressure fluid moving across the sealing surface will encounter interference; thus, minimizing leakage. In yet another design, U.S. Pat. No. 3,940,153—Stocker, the labyrinth seal is characterized by a succession of annular orifices or clearances between sealing teeth or knives on one member, and generally cylindrical surfaces or lands on the other. In combination, the sealing system defines a doubly recurved flow path from each orifice to the orifice next downstream.

The prior art systems, as exemplified above, employ the use of sharp turns of the through-flow fluid to provide additional fluid resistance. The through-flow fluid is forced to "zig-zag" or "serpentine" through the seal. The turning of the through-flow fluid in the prior art is achieved through the use of wall positioning the wall curvature. Not fully appreciating the kinetics involved in the turbulence generation/dissipation process in a sealing system, the prior art configurations were designed not from precise quantitative data, but from intuition and expectation. The concern of the prior art has been to increase the wall shear friction through the use of a long and tortuous flow path between each pair of annular orifices. By focusing on the use of wall shear stress, the prior art has neglected the turbulence generating potential of a free (i.e. away from wall) shear layer.

This reliance on wall shearing to turn the through-flow fluid has caused prior art devices to be characterized by a variety of "knives" and "lands." These features have been combined either acutely or irregularly to increase the wall shear friction between the fluid and the sealing surfaces of the seal. This has resulted in the sealing surfaces of prior art seals having an intricate and complex surface.

The prior art has continued to employ wall shear friction to turn the through-flow fluid. More particularly, prior art devices have relied upon wall positioning and wall curvature to turn the fluid and have failed to utilize the potential of turning available in configurations capable of producing free shear layers.

This failure is particularly evident when said prior art seals have been adapted for operation in intense operating environments, such as in military or space applications. To maintain an adequate seal in such harsh environment, the trend in the art has been toward an increase in the number of sealing cavities or chambers, as well as an increase in the complexity of the relative geometry of the interfacing sealing surfaces. The art has also been inclined toward the use of alreadable or honeycomb matrix materials attached to the stationary or the rotating member of the seal. In yet a further effort to achieve more effective sealing, the art has increasingly restricted the relative clearance between the moving seal members by diverting a portion of the fluid through a system of intricately machined slots.

As a result of these shortcomings in the art as thus described, many contemporary labyrinth seals have been quite expensive to produce due to the intricate machining required to finish each sealing surface. Such complex sealing surfaces have also been somewhat fragile and thus prone to failure in rigorous applications due to the inherent structural weakness of the thinly structured sealing teeth or buttresses. Further, the increasingly small, high or light tolerances of such seals between the movable members are often impractical where the rotary drive shaft is prone to move off center or wobble. Most important of these deficiencies, prior art sealing systems have generally failed to achieve optimum sealing efficiency in intense operating environments.

SUMMARY OF THE INVENTION

The present invention addresses many of the above-referenced and other disadvantages of prior art labyrinth seals by providing a much improved sealing system whereby the geometry of the sealing surface is designed to optimize flow deflection, thereby producing maximum turbulent shearing action in the high velocity, sharply curved, free shear layer of the seal. As a result of this improvement, turbulence dissipation and thus thermal energy generation is enhanced across the seal, with a commensurate improvement in seal performance.

The present invention was developed as a result of an extensive design optimization study of the leakage characteristics of countless seal designs. An advanced finite difference computer code was utilized for solving the complete governing equations containing all known fluid flow physical phenomena within the state-of-the-art computer modeling. By varying only a single design variable for each computer solution, an optimum value for these variables was found upon using values over a judiciously chosen range. Often the optimum value resulted from an important trade-off between opposing mechanisms. The best prospective designs from this study were fabricated and tested under a wide range of conditions.

In contrast to the prior art's use of wall positioning and curvature, the through-flow fluid in the present invention is caused by the unbalance of fluid pressure and the through-flow inertial forces. This pressure imbalance is created through employing specific geometric relationships derived from solutions obtained through the use of universally applicable and reliable computer models. As can be seen by reference to the accompanying drawings, the turning of the through-flow stream through a realization of the present invention occurs away from the wall. Prior art configurations generally rely on the wall itself to turn the through-flow fluid. The novel configuration employed in the present invention makes use of the kinetics involved in the turbulence generation/dissipation process to turn the through-flow fluid and thereby increase the seal's fluid resistance.

This free shear friction turning is significant in that it removes the prior art's dependence on intricate and expensive wall surfaces. This allows for reliable seal surfaces that can be easily machined and are more damage-resistant to shaft vibrations resulting in intense rubbing between the movable and stationary members of the seal.

In a general embodiment of the present invention, a radially stepped labyrinth seal is formed between a rotor and a stator of a design common in art. The seal itself involves a rotary shaft (rotor) having a plurality of axially spaced, angularly stepped portions having high pressure sides and low pressure sides, and a stationary busing (stator) surrounding the shaft, and having corresponding second annular stepped portions on its inner periphery, where the combination rotor and stator define a flow restricting stepped channel therebetween. In a general embodiment, the radial height S of each second annular stepped portion of the stator is defined by a function of the minimum clearance C, between edges of the first annular stepped portion and edges of the second annular stepped portion.

In another embodiment of the invention, an annular groove is defined in the wall of the stator and is located substantially opposite an edge on the high pressure side of the first annular stepped portion. Preferably in this embodiment, the depth D of this annular groove may be expressed as a function of the radial heights of each annular stepped portion of the stator. Alternatively, this depth D may be expressed in terms of the clearance C between the relatively rotating members.

Further embodiments of the present invention utilize additional annual grooves defined in either the first or second annular stepped portion. In these embodiments also, the geometry of the sealing surface has been optimized to accomplish maximum turbulent shearing.

The present invention has many advantages over the prior art. First, the present invention provides a more effective sealing configuration without resort to complex and/or fragile sealing geometries. Thus, the present seal is more efficient and damage resistant while being less expensive to manufacture.

The design of the present invention also allows for an effective seal when there is relative axial displacement between the rotor and stator due to vibration or to stresses from imbalanced fluid pressures or large temperature differentials. Thus, the present design forms an effective seal even if the two relatively rotating members are positioned slightly out of alignment.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1-11 of the drawings, like numerals being used for like and corresponding parts of the various drawings.

Figure 1:
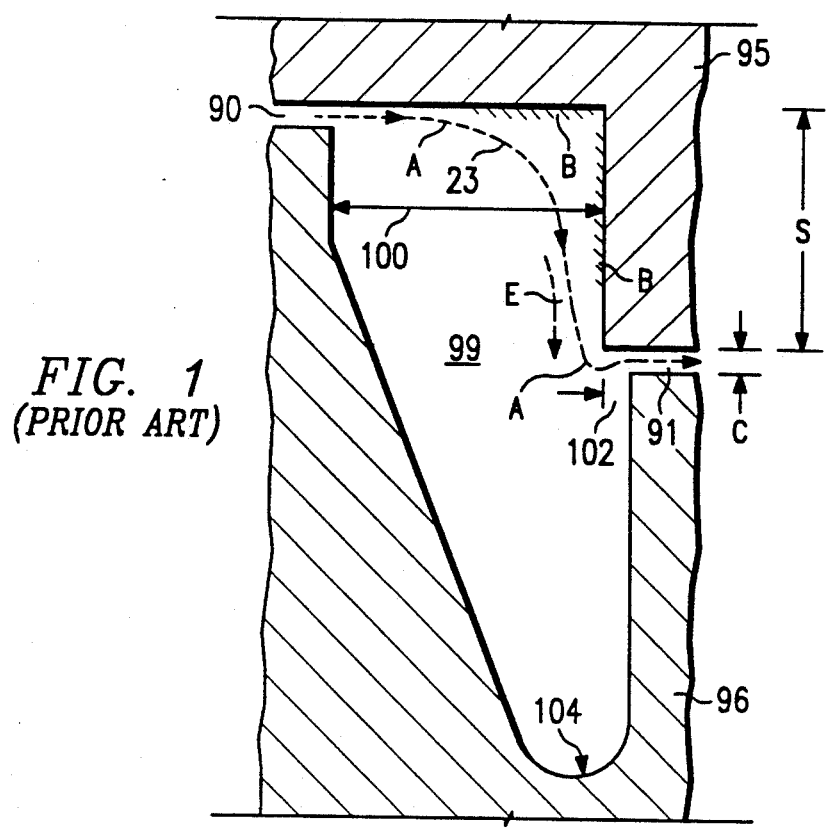
FIG. 1 is a longitudinal detailed section of a prior art labyrinth seal, taken in a plane containing the axis of rotation.

FIG. 1 is a longitudinal section of a state-of-the-art prior art seal manufactured by the Rocketdyne Division of Rockwell International. The seal design illustrated in FIG. 1 is presently used in the high-pressure liquid hydrogen fuel pumps used in the United States space shuttle program.

The seal illustrated in FIG. 1 is characterized by an intake 90 and a flow channel 91 formed between a stator 95 and a rotor 96. In this design, intake 90 is at an area of higher pressure and upstream from discharge 91. Interposed between intake 90 and flow channel 91 is a cavity 99. Areas of highest radial or longitudinal flow velocity (and hence highest turbulence) in this design are represented by point A. Areas of leakage flow spreading are shown by point E. Areas of high wall shear friction are shown by hatching at point B.

Figure 2:
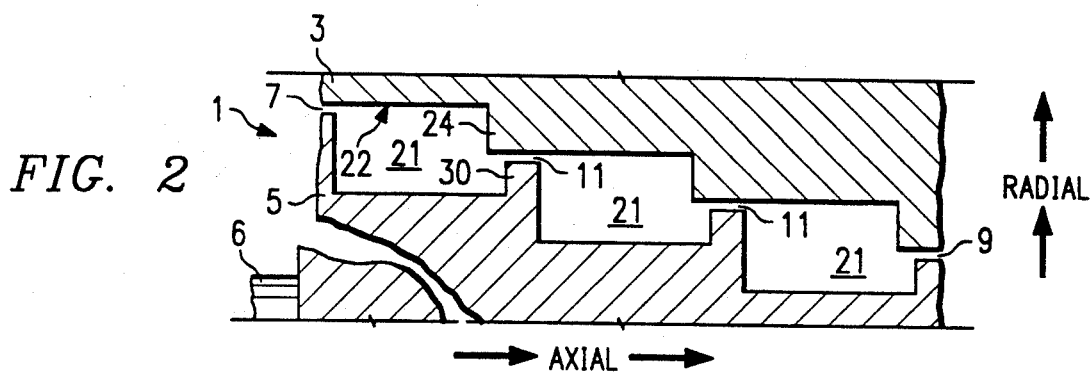
FIG. 2 is a longitudinal section of one embodiment of the present invention, taken in a plane containing the axis of rotation.

FIG. 2 generally illustrates an axial-flow labyrinth seal 1 of the present invention comprising an outer stationary member or stator 3 and an inner rotary member or rotor 5. The rotor 5 may be integral or fixed suitably to a rotating member, such as a shaft 6. The stator 3 may be suitably fixed to a support (not shown) which may be some part of the frame of a compressor, turbine, etc.

It is envisioned that the relative position of the rotor 5 and stator 3 may be interchanged from that shown in FIG. 2. Hence, in alternate embodiments it is possible to adopt a rotor configuration similar to that shown for the stator and vice versa. Similarly, the fluid flow surfaces may be arranged for where leakage and flow occurs primarily in the radial direction rather than in the axial direction as shown.

In FIG. 2, the seal 1 is disposed between two spaces containing either gas or liquid at different levels of pressure. In this figure may be seen the alternating arrangement of the annular grooves or cavities 21 and flow channels or orifices 11. For the sealing structure illustrated in this figure, the higher pressure of upstream end of the seal is at 7, and the lower pressure or downstream end of the seal at 9. The downstream end 9 of the seal 1 may be vented to atmosphere or sub-atmosphere pressure depending on the particular application for which the seal 1 is to be used. For other applications, both ends of the seal 1 may be at quite high pressures, but a pressure differential exists from 7 to 9 in either case.

The aforementioned background material applies generally to conventional labyrinth seals commonly employed in the art. The present invention, however, is directed to a specific configuration seal where the geometry of the sealing surfaces between the rotor 5 and the stator 3 is generally determined as a function of the relative juxtaposition of stepped surfaces on the stator 3 and the rotor 5 with regards to relative clearance, and offset, as will be further described herein.

Figure 3:
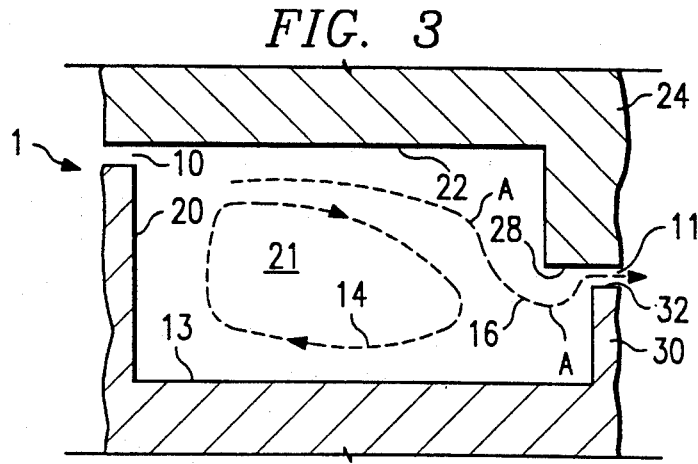
FIG. 3 is a detailed view of the longitudinal section illustrated in FIG. 2.

Referring to FIG. 3, high velocity fluid enters the seal 1 between stator 3 and rotor 5 through an entry space or orifice 10 into cavity 21, the downstream end of which is nearly blocked by a radically stepped portion 24 of the stator 3 in combination with a second radially stepped portion 30 of the rotor 5. As illustrated, the radially stepped portions 24 and 30 may be included perpendicular to the longitudinal axis of fluid flow. However, these stepped potions may also adopt various other angled or curved configurations with respect to the axis of fluid flow, such as 45° from the axial direction.

Gas or liquid thus entering the seal 1 flows into a chamber or cavity 21, said cavity 21 defined by radially stepped portions 24 and 30 on the downstream end of said chamber 21, a stator flow surface 22, a surface 20 opposite the stepped portion 30 of the rotor 5, and the rotor flow surface 13. Fluid entering cavity 21, generally flows along the stator flow surface 22 until it is redirected in a downward direction by the annular stepped portion 24, where the trapped fluid adopts a circular path indicated by arrow 14. The escape path for any fluid exiting chamber 21 is thus made through the flow channel or orifice 11 downstream from entry space or orifice 10.

Figure 4:
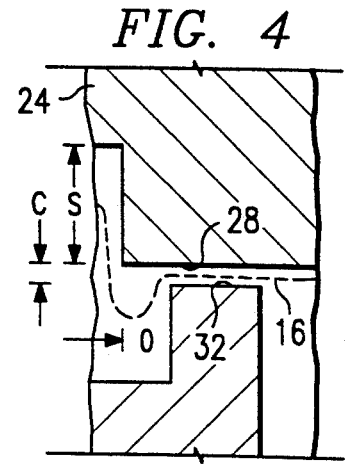
FIG. 4 is a detailed view of FIGS. 2 and 3 illustrating the fluid flow path as it encounters an annular slit or exit orifice between adjacent stepped surfaces.

In order to escape through flow channel 11, fluid flow must re-curve and flow as indicated generally by arrows 16 in FIGS. 3 and 4, thus undergoing designed deflection from flow surfaces of cavity 21. This retroverted flow causes a considerable degree of turbulence in addition to what turbulence will naturally result from the expansion of the fluid after it passes through entry 10 into cavity 21. The preferred flow path shown by arrow 16 in FIGS. 3 and 4 is one of extremely sharp curvature while at high velocity. By imparting such a curved motion to fluids entering cavity 21, an unusually large portion of the pressure energy is transformed into turbulence energy which is then dissipated into heat. Areas of greatest radial velocity and hence highest turbulence are shown at point A. Hence, the pressure of the fluid entering the following cavity is considerably reduced, which gives a reduced leakage rate across the seal 1.

It has been discovered that the aforereferenced principles of very high turbulence dissipation may be optimized when the geometry of flow surfaces between the relatively rotatable members is described in terms of the relative clearance therebetween. Hence, and as may be seen by reference to FIGS. 3 and 4, the radial height S of the stepped portion 24 should preferably bear some relation to the clearance C described between adjacent rotating seal surfaces 28 and 32. In one preferred embodiment in accordance with the present invention, this height S should be in the range of ¼ to 25 times the clearance C between the adjacent surfaces 28 and 32. In preferred embodiments also, the offset O with which the radially stepped portion 24 of the stator 3 overlaps the upstream stepped portion 30 of the rotor 5 is defined in range of 0.0S to 3.0S.

This referred radial step height S enables the seal of the invention to achieve superior leakage performance over state-of-the-art labyrinth seals of similar designs. One reason for this increase in performance is schematically seen by comparisons between FIG. 1 and FIGS. 2–4. The seal design represented in FIG. 1 (as with almost all contemporary prior art seals) emphasizes the wall shear friction component (as seen at B) instead of optimizing the more important free shear layer friction component. (As seen at A.) This is caused since the seal fails to utilize an optimum step height S. Thus, fluid flow along the seal surface illustrated in FIG. 1 undergoes leakage flow spreading (as seen at E) due to turbulent diffusion of radial momentum normal to fluid flow as seen by arrow 23. In summation, fluid velocity is slowed over the larger step height S, resulting in higher pressure downstream of each channel 91, and thus poorer sealing. In contrast, the seal designs of the present invention (illustrated in FIGS. 2–4) utilize a preferred step height S (as well as preferred offsets O) to enhance the high velocity, curved fluid flow through the seal. Hence, incrementally lower pressures are achieved across the seal with a commensurate reduction in overall mass leakage.

Figure 10:
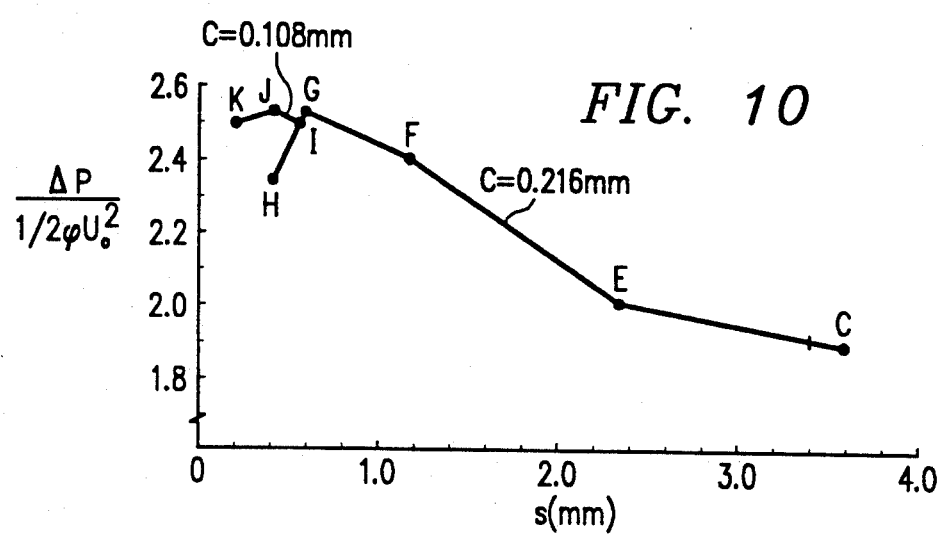
FIG. 10 is a graphical representation of the relative performance of a seal design given a varying relationship between the clearance C and the step height S.

The predicted effect of these optimum ranges may be seen in FIG. 10 which represents the effect of variations in cavity step height S on bulk cavity inlet-to-outlet pressure drop. To determine this predicted effect, a fixed leakage flow rate was specified and the corresponding $\Delta P$ was calculated. The points C, E, F, G and H graphically represented in FIGURE 10 were calculated for a static clearance C of 0.216 mm. The points K, J, and I were calculated for a clearance C of 0.108 mm. In FIG. 10, point C represents the bulk cavity inlet-to-outlet pressure drop for the S/C ratio utilized in a design similar to the Rocketdyne seal design illustrated in FIG. 1. The actual clearance of the Rocketdyne wear ring seal varies with operating condition and other variables, hence a nominal clearance of 0.216 mm was adopted as a baseline constant value. Points E, F, G and H represent points arbitrarily selected within the claimed range of S, i.e. $\frac{1}{4} C \leq S \leq 25C$. Clearly, for all values within the claimed range, a superior pressure differential was observed. For S/C ratios outside the claimed range, however, dramatic decreases in performance were observed.

Figure 11:
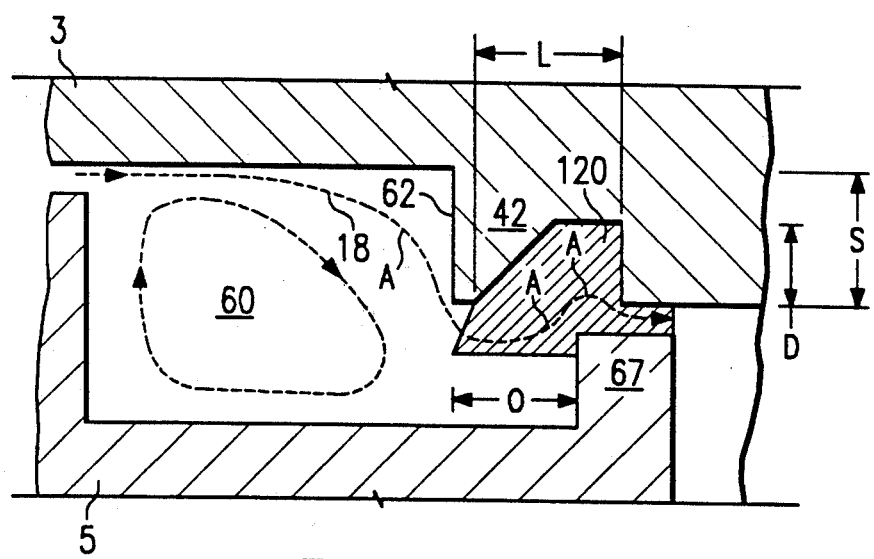
FIG. 11 is a longitudinal section of another embodiment of the invention, taken in a plane containing the axis of rotation.

As FIG. 11 illustrates, various fibers 120 may be attached to the rotor and/or stator so as to fill in the clearance region formed between the edges of the first annular stepped portion and the edges of the second annular stepped portion. The addition of the fibers further increases the fluid resistance of the seal and enhances its ability to prevent seal leakage.

Figure 5:
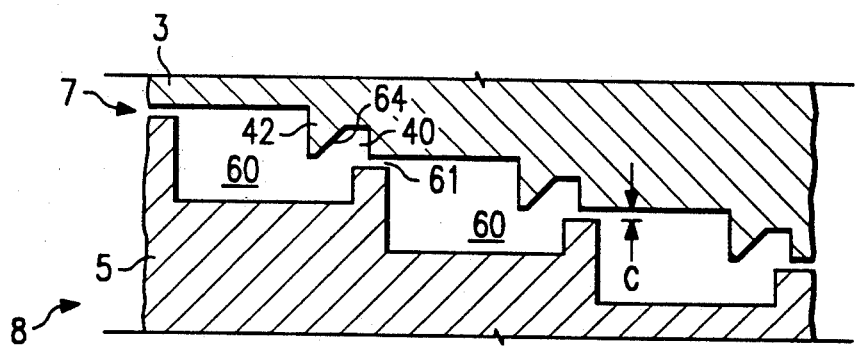
FIG. 5 is a longitudinal section of a second embodiment of the present invention illustrating an auxiliary cavity formed along the stator sealing surface.

FIG. 5 illustrates a second embodiment of the present invention where a seal 8 is formed between the stator 3 and rotor 5. Similar to the sealing system illustrated in FIGS. 2–4, the present seal is characterized by a series of radially stepped annular portions on both the rotor 5 and the stator 3, such as to define a series of cavities 60 and channels or orifices 61. In this embodiment, however, a supplemental, annular groove 40 is formed in the stepped, annular surface of the stator 3, said groove 40 defining a finger or protrusion 42. Alternatively, this groove 40 may also be formed in the stepped annular surface of the rotor 5 (not shown).

As shown in FIG. 5, the annular groove 40 is defined in part by an inclined surface, or buttress 64 on the downstream side of the finger 42. This design is felt preferable in rigorous applications where there exists a probability that the finger 42 might become bent or damaged. Alternately, the groove 40 can be defined by walls formed perpendicular to the flow surfaces as previously illustrated in FIGS. 2–4.

Figure 6:
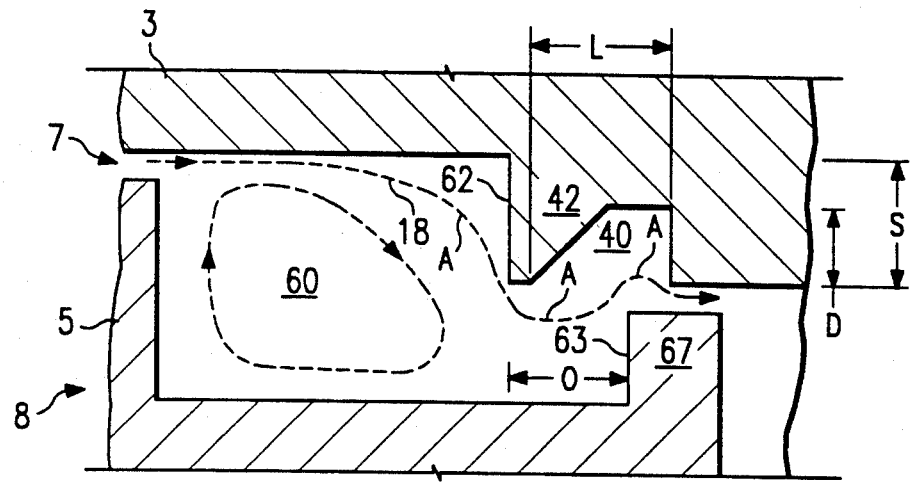
FIG. 6 is a detailed view of the longitudinal section illustrated in FIG. 5.

As may be seen by references to FIGS. 5 and 6, the presence of supplemental groove 40 and associated protrusion 42 further enhances the dissipation effect described in association with the general embodiment illustrated in FIGS. 2–4. Referring to FIG. 6, fluid entering chamber 60 encounters a partial blockage formed by the combination of the upstream surface 62 of the protrusion 42 and the upstream face 63 of the annular stepped portion 67 of the rotor 5. In this embodiment, however, liquid or gas escaping past this partial obstruction is directed upward into supplemental groove 40 by the offset O of the upstream face 62 and 63. This effect is seen by arrows 18 in FIG. 6 where A represents the areas of highest free shear layer friction. In such a fashion additional turbulence is generated with a further enhancement of pressure energy dissipation of fluid moving across sealing surfaces 28 and 32.

In preferred embodiments, the sealing surfaces of the embodiment illustrated in FIGS. 5 and 6 also utilize optimum geometric relationships present over the surface of the overall sealing system. Optimally, the depth D of this additional groove 40 may be expressed as a function of the radial height S of the annular stepped portion 42 of the stator 3, such that $S/16 \leq S \leq 2.0S$. Expressed in terms of the relative clearance C between the rotating members 3 and 5, this depth should optimally in the range of $\frac{1}{8}C–15C$.

To obtain optimum results in this design, it has been additionally discovered that there exists a preferred range with which the upstream surface 62 of the annular stepped portion 42 should be offset from the upstream surface 63 of the rotor. It has been found that this offset O should preferably be in the range of 0.0L to 1.2L, where L is the axial length of cavity 40 as shown. This length L is preferably in the range of 0.1T to 2.5T where T is the maximum possible relative axial movement of the rotor 3 of the stator 5 due to various forces and vibrations accompanying normal operation.

Figure 7:
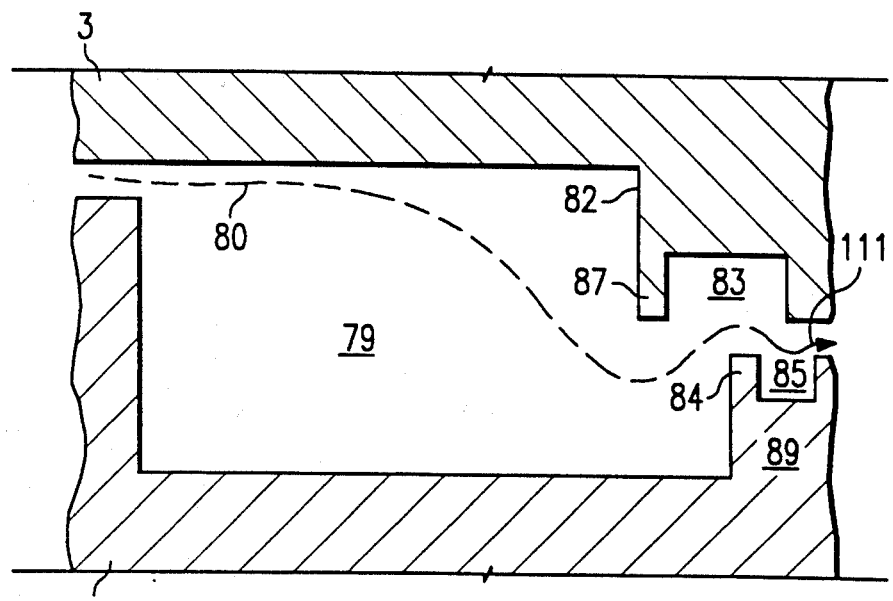
FIG. 7 is a longitudinal section of a third embodiment of the present invention taken in a plane containing the axis of rotation.

In yet another embodiment illustrated in FIG. 7, a second, supplemental groove 85 is defined in the flow channel or orifice 111 downstream from an annular groove 79. As shown, this second groove 85 is disposed in the rotor 5 so as to define a protrusion 84 in the radially stepped portion of the rotor. This second supplemental groove 85 is offset from a first supplemental groove 83 defined in the stator 3 as shown.

The design of this embodiment further enhances the sealing efficiencies of a given seal. As indicated by flow arrows 80, fluid entering the cavity 79 is first forced to adopt a curved flow pattern due to the upstream surface 82 of protrusion 87. Fluid is directed downwardly as shown by arrow 80 until it clears surface 82 and is deflected into a first annular groove 83, where it adopts a curvilinear, upward flow pattern. Fluid escaping annular groove 83 is deflected into the second groove 85 where it now adopts a curvilinear, downward flow pattern.

Figure 8:
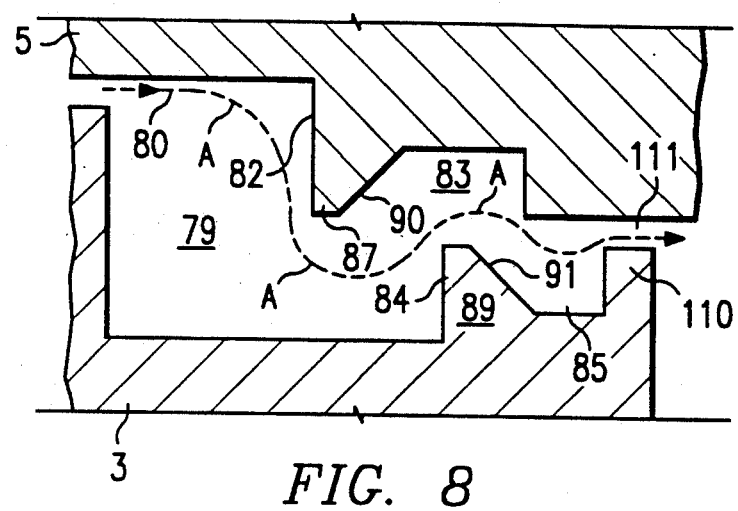
FIG. 8 is a longitudinal section of a fourth embodiment of the invention.

A more robust embodiment of the design illustrated in FIG. 7 is seen in FIG. 8. This embodiment is felt preferable to the design illustrated in FIG. 7 where axial displacement between the relatively moveable members is expected. In this figure, the relative position of the rotor 5 and stator 3 have been reversed. In this embodiment, protrusions 87 and 84 defined in the rotor 5 and stator 3, respectively, have been buttressed by the addition of inclined walls 90 and 91. Though in FIG. 8, these buttressing walls are shown at a 45° angle, other angular or curved configurations are also contemplated in accordance with the spirit of the present invention. In this design, the areas of highest free shear layer friction are shown at A.

The relative efficiency of any given seal design is achieved as a result of the judicious selection of a number of variables including clearance C, radial height S, offset O, etc. Especially important to the efficiency of a given seal design are the radial step height S and the offset O. For applications where one or more of these variables widely fluctuates during operation of the system in which the seal is integrated, seal designs specifically tailored for a given operating condition may not be practical. In such applications, therefore, it is preferable to adopt a seal design which exhibits favorable sealing characteristics across a relatively wide range of operating conditions.

Figure 9:
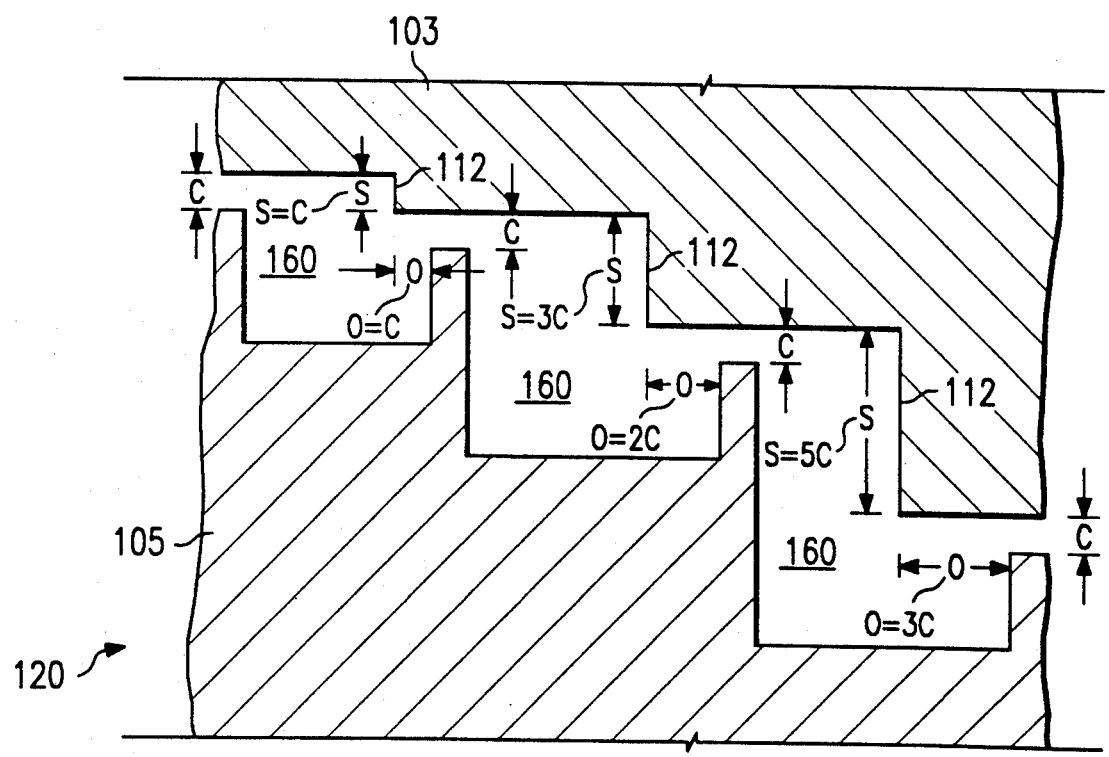
FIG. 9 is a longitudinal section of a fifth embodiment of the invention, taken in a plane containing the axis of rotation.

To accomplish this desired result, yet another embodiment of the present invention is seen in FIG. 9. In this embodiment, the seal of the invention is designed for maximum average efficiency over a variety of operating conditions. As such, the seal 120 is designed such that a variety of different sized annular cavities 160 are formed between the rotor 105 and the stator 103, resulting in a variety of step heights S of the radial portions 112. These step heights S may vary across the seal 120, as illustrated varying from S=15C to S=5C. In such a fashion, favorable sealing with minimum leakage may be achieved relatively independent of the clearance C of the seal. Further, the seal may be designed so that each cavity has a slightly different offset O, which is also exemplified in FIG. 9. Similarly, this would enable the leakage to be relatively independent of the relative axial displacement between the rotor and stator.

To further illustrate the invention and its relative improvement over the prior art, Applicant has performed several laboratory experiments comparing the relative sealing efficiency for several of the desired embodiments of the invention in comparison to state-of-the-art labyrinth seals currently in use. The example which follows should not be considered as limiting the invention but rather only as exemplary of various embodiments based on one of those laboratory results.

EXAMPLE

To compare the relative performance of several seal designs, a baseline measurement of dimensionless mass leakage rate, was utilized. The measured mass leakage rate $\alpha$ is given by following equation:

$$\alpha = \frac{\dot{m}}{E_c A_t}\left(\frac{[n + \ln(P_o/P_n)]}{\rho_o P_o[1 - (P_n/P_o)^2]}\right)^{\frac{1}{2}}$$

where $\dot{m}$=the mass flow rate, $E_c$=a carry-over coefficient, $A_t$=the seal leakage area, $\rho_o$=the seal inlet pressure, $P_n$=the outlet pressure of the seal, $\rho_o$=the fluid density at the seal inlet and n = number of teeth occurring in the rotor or stator across the sealing surface.

A state-of-the-art labyrinth seal as manufactured by Rocketdyne Division of Rockwell International was measured as a test seal to establish a preferred prior art mass leakage rate $\alpha$. As noted, this seal design as illustrated in FIG. 1 is currently utilized in the high pressure hydrogen fuel pump of the United States space shuttle. As such, this seal design is felt to be exemplary of state-of-the-art labyrinth seal designs presently in use.

The seal design in FIG. 1 utilizes a clearance C of 0.0085", an interior width 100 of chamber 99 of 0.145", an offset O between the high pressure edges of the rotor 96 and stator 95 of 0.15" or 1.75C, and a radius 104=0.03R" for the bottommost portion of cavity 99. Further in this design, the radial height S of the first annular stepped portion 121 is 0.125" or 14.7 times the clearance C, which was established at a constant 0.0085" for all seal embodiments used in this example. Though the test seal was designed for use with liquid hydrogen, the present example incorporated water as a working fluid.

The seal design of embodiments 1-3 (as illustrated in FIGS. 2, 5 and 8, respectively) utilized flow surfaces characterized by optimum geometric ranges of the claimed invention. For example, the seal illustrated in association with the first embodiment of the invention utilized a radial height S of such annular stepped portion defined within a range ¼ to 25 times the clearance C between the axially normal surfaces of both the first and second annular stepped portion. Also in the first embodiment, the offset O was defined within a range 0.0 and 3.0T, where T is the maximum relative axial displacement between rotor and stator which results from large forces during operation.

For the second embodiment as illustrated in FIG. 5, a first supplemental cavity 40 was formed having an optimum depth within a range ⅛ to 15 times the clearance C. In the second embodiment, the offset O between the first and second annular stepped portion was defined within a range 0.0 to 3.0T, where T is the maximum relative axial displacement between the rotor and stator.

No optimum ranges were utilized in association with the third embodiment illustrated in FIG. 8.

The seals were tested under the following uniform test conditions:
- 120 psi pressure drop across the seal,
- 5,000 rpm shaft speed,
- 0.0085" clearance C between the relatively movable members.

The following results were established:

| % Improvement Over Test Seal | Example | $\alpha$ | Number of Teeth |
|---|---|---|---|
| — | Test Seal | .904 | 4 |
| 66% | Embodiment 1 | .321 | 10 |
| 30% | Embodiment 2 | .664 | 4 |
| 41%* | Embodiment 3 | .565* | 4 |

As can be appreciated from the foregoing example, all embodiments of the present invention demonstrated a significant performance improvement over a state-of-the-art seal designed for the most rigorous applications. In the case of embodiment 1 (containing 10 teeth) as illustrated in FIGS. 2-4, a 66% decrease in the mass leakage rage $\alpha$ was realized. For the second embodiment of the present seal described in association with FIGS. 5-6, a 30% decrease was seen (utilizing four teeth). Finally, when a second annular groove was incorporated as illustrated in FIG. 7, a 41% decrease was estimated to occur over the test seal.

ADDITIONAL DESCRIPTION

A labyrinth seal constructed in accordance with the present invention can be generally described as a plurality of inter-connected fluid cavities 21 that are disposed between rotor 5 and stator 3. Each cavity 21 has an inlet orifice and an outlet orifice. As shown in FIG. 2, outlet orifice 11 or one cavity 21 functions as an inlet orifice for the adjacent cavity 21. Cavities 21 are spaced axially adjacent to each other along a portion of rotating shaft 6, and are also preferably radially stepped with respect to each other along the axis of rotor drive. Cavity 21 is an annular space between rotor 5 and stator 3 defined in part by inside diameter or flow surface 22 of stator 3, and outside diameter or flow surface 13 of rotor 5.

Inlet orifice 10 to cavity 21 as shown in FIG. 3 is defined in part by a small gap or clearance between radial projection 20 from the exterior of rotor 5 in the inside diameter 22 of stator 3 adjacent thereto. Outlet orifice 11 of cavity 21 as shown in FIG. 3 is defined in part by stepped portion 30 of rotor 5 which projects radially outward and stepped portion 24 of stator 3 which projects radially inward. Surface 28 on stepped portion 24 of stator 3 is positioned adjacent to surface 32 on stepped portion 30 of rotor 5. Surfaces 28 and 32 partially define exit orifice 11. As shown in FIGS. 2, 3 and 4, close surface 28 is preferably offset from close surface 32. The height of stepped portion 24 on stator 3 and the amount of offset between stepped portion 24 and stepped portion 30 of rotor 5 cooperate to maximize the amount of free shear type friction created within cavity 21 by fluid flow therethrough.

As shown in FIGS. 5, 6, 7 and 8, the present invention allows maximizing the amount of turbulence generated by free shear friction by placing annular grooves in either or both flow surfaces 28 and 32. As previously described, these additional annular grooves cooperate with their associated cavity to maximize free shear friction. For a given operating environment, the present invention allows maximizing the offset between stepped portions 24 and 30. The dimensions of the exit orifice, the number of annular grooves, and their associated dimensions.

Although the present invention and its advantages have been described in detail, it should be understood that various changes, substitutions and alterations can be made therein without departing from the spirit and scope of the invention as defined by the appended claims.

What is claimed is:

1. A rotary shaft seal for restricting fluid flow from a high pressure area to a low pressure area along a rotary shaft disposed within a stationary busing comprising:
   a stator provided by the stationary bushing;
   a rotor formed on a portion of the rotary shaft within the stationary busing adjacent to the stator;
   a plurality of cavities disposed between the exterior of the rotor and the interior of the stator;
   an annular inlet orifice and an annular outlet orifice for each cavity with the outlet orifice of one cavity serving as the inlet orifice for an adjacent cavity;
   each cavity having interior surfaces defined in part by a portion of the outside diameter of the rotor, the inside diameter of the stator and axially spaced radial projections from the rotor and the stator which extend towards each other;
   the annular inlet orifice for the first cavity defined in part by the first radial projection from the rotor and the inside diameter of the stator adjacent to the first radial projection from the rotor;
   the annular outlet orifice for the first cavity defined in part by a second radial projection from the rotor and the first radial projection from the stator;
   the annular inlet and outlet orifices for the remaining cavities defined in part by adjacent radial projections from the rotor and the stator;
   each radial projection from the rotor and the stator having a high pressure side and a low pressure side;
   an offset at each annular outlet orifice between the high pressure side of the radial projection from the stator and the high pressure side of the radial projection from the rotor; and
   a variance in the amount of offset between the annular outlet orifice of adjacent cavities.

2. The rotary shaft seal as defined in claim 1 wherein the offset further comprises means for maximizing free shear fluid flow friction within each cavity.

3. The rotary shaft seal as defined in claim 1 further comprising an annular groove formed in selected radial projections from the stator.

4. The rotary shaft seal as defined in claim 1 further comprising an annular groove in selected radial projections from the rotor.

5. The rotary shaft seal as defined in claim 1 further comprising:
   an annular groove in each radial projection from the stator; and
   an annular groove in selected radial projections from the rotor.

6. The rotary shaft seal as defined in claim 1 further comprising a variance in the height of the radial projections which partially define each annular outlet orifice.

7. The rotary shaft seal as defined in claim 1 wherein the radial projections comprise means for turning the direction of fluid flow through each cavity prior to the fluid flow stream contacting the radial projections from the stator and the rotor at the annular outlet orifice.

8. The rotary shaft seal as defined in claim 1 further comprising:
   the annular inlet and outlet orifices being defined in part by the clearance between adjacent radial projections from the rotor and the stator; and
   the clearance selected to be greater than any anticipated movement of the rotor relative to the stator due to changing load conditions on the rotary shaft.

9. The rotary shaft seal as defined in claim 1 further comprising means for maintaining a uniform leakage rate of fluid flow between the rotor and the stator as the difference in fluid pressure across the rotary shaft seal varies.

10. A method of providing a rotating shaft seal to restrict fluid flow from a high pressure area to a low pressure area on a rotating shaft having a rotor disposed within a stationary bushing having a stator comprising the steps of:
    forming a plurality of radial projections from the rotor and the stator extending towards each other with each radial projection having a high pressure side and a lower pressure side;
    spacing the radial projections from the rotor axially apart from each other and spacing the radial projections from the stator axially apart from each other to partially define fluid cavities therebetween;

placing a gap between adjacent radial projections from the rotor and the stator to partially define both an annular outlet orifice for one fluid cavity and an annular inlet orifice for an adjacent fluid cavity;

providing an offset at each annular outlet orifice between the high pressure side of the associated radial projection from the stator and the high pressure side of the associated radial projection from the rotor;

placing an annular groove in each fluid cavity adjacent to the annular outlet orifice; and optimizing the location and size of each annular groove relative to its associated fluid cavity to achieve enhanced free shear friction.

11. The method of providing a rotating shaft seal as defined in claim 10 further comprising the steps of:
  placing an annular groove within selected radial projections from the stator; and
  placing an annular groove within selected radial projections from the rotor.

12. The method of providing a rotating shaft seal as defined in claim 10 further comprising the steps of forming the gap between adjacent radial projections from the stator and the rotor with more clearance than the designed maximum movement of the rotor relative to stator with changing load conditions on the rotating shaft.

13. The method of providing a rotating shaft seal as defined in claim 10 further comprising the step of varying the offset of adjacent fluid cavities to maintain a constant fluid flow rate through the fluid cavities in response to changes in fluid pressure across the rotating shaft seal.

14. The method of providing a rotating shaft seal as defined in claim 13 further comprising the step of varying the volume of each fluid cavity.

15. The method of providing a rotating shaft seal as defined in claim 10 further comprising the steps of:
  selecting a first height for the radial projections;
  selecting a first distance for the amount of offset at each annular outlet orifice;
  calculating the amount of turning in the direction of fluid flow through each cavity resulting from the first height for radial projections from the stator and the first distance for the offsets; and
  optimizing the height of the radial projections and the distance of the offset to enhance turning in the direction of fluid flow through each cavity prior to the fluid flow stream contacting the radial projection from the stator and the radial projection from the rotor at the annular outlet orifices.

16. A rotary shaft seal for restricting fluid flow from a high pressure area to a lower pressure area along a rotary shaft disposed within a stationary bushing comprising:
  a stator formed on the interior of the stationary bushing;
  a rotor formed on a portion of the rotary shaft disposed in the stationary bushing radially adjacent to the stator;
  a plurality of fluid cavities disposed between the exterior of the rotor and the interior of the stator;
  the fluid cavities having a radially stepped arrangement along the axis of the rotor;
  an annular inlet orifice and an annular outlet orifice for each fluid cavity with the outlet orifice of one fluid cavity serving as the inlet orifice of an adjacent fluid cavity;
  each fluid cavity having interior surfaces defined in part by a portion of the outside diameter of the rotor, the inside diameter of the stator and a plurality of axially spaced radial projections from the rotor and the stator which extend towards each other;
  the annular inlet orifice for the first fluid cavity defined in part by the first radial projection from the rotor and the inside diameter of the stator adjacent to the first radial projection from the rotor;
  the annular outlet orifice for the first fluid cavity defined in part by the second radial projection from the rotor and the first radial projection from the stator;
  the annular inlet and outlet orifices for the remaining fluid cavities defined in part by adjacent radial projections from the rotor and the stator with each radial projection having a high pressure side and a low pressure side;
  an offset at each annular outlet orifice between the high pressure side of the radial projection from the stator and the high pressure side of the radial projection from the rotor; and
  the axial length of each annular outlet orifice less than the axial length of its associated fluid cavity.

17. The rotary shaft seal as defined in claim 16 further comprising an annular groove in selected fluid cavities adjacent to the annular outlet orifice.

18. The rotary shaft seal as defined in claim 17 further comprising an annular groove formed in selected radial projections from either the stator or the rotor.

19. The rotary shaft seal as defined in claim 17 further comprising fiber material disposed within an annular groove.

20. The rotary shaft seal as defined in claim 17 further comprising:
  an annular groove in each radial projection from the stator; and
  an annular groove in selected in radial projections from the rotor.

* * * * *

UNITED STATES PATENT AND TRADEMARK OFFICE
CERTIFICATE OF CORRECTION

Page 1 of 2

PATENT NO. : 5,244,216
DATED : Sept. 14, 1993
INVENTOR(S) : David L. Rhode

It is certified that error appears in the above-identified patent and that said Letters Patent is hereby corrected as shown below:

Column 1, lines 9-10
Please insert above "TECHNICAL FIELD OF THE INVENTION"
--NOTICE
This invention was made with Government support under Contract No. NAS8-36161 awarded by NASA. The Government has certain rights in this invention.--

Column 2, line 1, delete "reduce" and insert --reduced--.
Column 4, line 34, delete "annual" and insert --annular--.
Column 6, line 18, delete "radically" and insert --radially--.
Column 6, line 23, delete "potions" and insert --portions--.
Column 8, line 38, insert --be-- before "in the range".
Column 9, line 60, insert --the-- between "by" and "following".

Column 10, line 14, delete "0.15"" and insert --.015--.
Column 10, line 60, insert --*Estimated Value Only-- below chart.
Column 10, line 67, delete "rage" and insert --rate--.
Column 11, line 12, delete "or" and insert --for--.
Column 11, line 57, delete "busing" and insert --bushing--.
Column 11, line 60, delete "busing" and insert --bushing--.

UNITED STATES PATENT AND TRADEMARK OFFICE
CERTIFICATE OF CORRECTION

PATENT NO. : 5,244,216
DATED : September 14, 1993
INVENTOR(S) : David L. Rhode

It is certified that error appears in the above-indentified patent and that said Letters Patent is hereby corrected as shown below:

Column 14, line 55, delete second occurrence of "in".

Signed and Sealed this

Seventh Day of June, 1994

Attest:

BRUCE LEHMAN

Attesting Officer     Commissioner of Patents and Trademarks